United States Patent [19]

Osmond

[11] Patent Number: 6,044,468
[45] Date of Patent: Mar. 28, 2000

[54] SECURE TRANSMISSION USING AN ORDINARILY INSECURE NETWORK COMMUNICATION PROTOCOL SUCH AS SNMP

[75] Inventor: Roger F. Osmond, Littleton, Mass.

[73] Assignee: EMC Corporation, Hopkinton, Mass.

[21] Appl. No.: 08/917,324

[22] Filed: Aug. 25, 1997

[51] Int. Cl.[7] ........................................................ H04L 9/00
[52] U.S. Cl. ........................ 713/201; 380/281; 380/282; 380/285
[58] Field of Search ............................. 713/201; 380/281, 380/282, 283, 285, 44

[56] References Cited

PUBLICATIONS

J. Case, M. Fedor, M. Schoffstall, and J. Davin, " A Simple Network Management Protocol (SNMP)," RFC 1157, by May 1990, 36 pages.
Network Working Group, G. Walters, Editor, "User–based Security Model for SNMPv2," RFC 1910, Feb. 1996, 40 pages.
Ulyless Black, *TCP/IP and Related Protocols*, McGraw–Hill, Inc., New York, N.Y., pp. 304–310.
*Computer Security*, Time–Life Books, Inc., Richmond, Va., 1990, pp. 87–117.
Roger M. Needham, "The Changing Environment for Security Protocols," IEEE Network, IEEE, New York, N.Y., vol. 11, No. 3, May/Jun. 1997, pp. 12–15.
Chadwick et al., "Merging and Extending the PGP and PEM Trust Models—The ICE–TEL Trust Model," IEEE, Network, IEEE, New York, N.Y., vol. 11, No. 3, May/Jun. 1997, pp. 16–24.
Blumenthal et al., " Key Derivation for Network Management Applications," IEEE Network, IEEE, New York, N.Y., vol. 11, No. 3, May/Jun. 1997, pp. 26–29.

Michael Herfert, "Security Enhanced Mailing Lists," IEEE Network, IEEE, New York, N.Y., vol. 11, No. 3, May/Jun. 1997, pp. 30–33.

Peyravian et al., "Asynchronous Transfer Mode Security," IEEE Network, IEEE, New York, N.Y., vol. 11, No. 3, May/Jun. 1997, pp. 34–40.

Schneier, Applied Cryptography, pp. 5, 51, 56, 68, 210, 1995.

*Primary Examiner*—Thomas R. Peeso
*Attorney, Agent, or Firm*—Arnold White & Durkee

[57] ABSTRACT

An encryption service in a manager encrypts network management information with a secret key that can be recognized by an agent to which the message is directed. The encryption service invokes an SNMP message transmission service in the manager to form a secure SNMP message having an apparent Object ID (OID) that identifies a decryption service in the agent and having an apparent Value that includes the encryption result. The SNMP message transmission service invokes a communication protocol service in the manager to send the secure SNMP message to the agent. A communication protocol service in the agent receives the secure SNMP message, and passes the received message to an SNMP message reception service in the agent. The SNMP message reception service checks whether or not a Community Name visible in the secure SNMP message is appropriate for access to the agent, and if so, searches a Management Information Base (MIB) in the agent for a sub-agent corresponding to the apparent OID, and if such a sub-agent is found, dispatches the apparent Value of the apparent OID to the sub-agent. The sub-agent decrypts the encryption result in the apparent Value, and rejects the message if the sub-agent is unable to recognize a secret key authorized for access to the agent.

62 Claims, 8 Drawing Sheets

SECURE TRANSMISSION USING AN ORDINARILY INSECURE NETWORK COMMUNICATION PROTOCOL SUCH AS SNMP

BACKGROUND OF THE INVENTION

1. Field of the Invention

The present invention relates generally to data access and security for entities communicating over a data network, and more particularly to a security mechanism for an ordinarily insecure network communication protocol such as the Simple Network Management Protocol (SNMP).

2. Description of the Related Art

The Simple Network Management Protocol (SNMP) is a standard applications-level protocol by which management information for a network element may be inspected or altered by logically remote users. SNMP is widely used for managing the Internet and other networks using the Transmission Control Protocol (TCP/IP) or the User Datagram Protocol (UDP) for client-server communication. SNMP, however, is not limited to any particular client-server communication protocol, since SNMP governs the content and protocol of messages for accessing the management information and not the particular manner in which the messages are transmitted. SNMP is defined in an Internet standards document, RFC 1157, by J. Case, M. Fedor, M. Schoffstall, and J. Davin entitled "A Simple Network Management Protocol (SNMP), May 1990, incorporated herein by reference.

SNMP messages are transmitted between a client (called a "manager" in the RFC 1157) and a server (called an "agent" in the RFC 1157) in a network. Each SNMP message is an ASN.1 standard data structure that includes an SNMP version number of type INTEGER, a community name of type OCTET STRING (a string of 8-bit bytes), and data of type ANY. The agent has an authentication service that uses the community name as a kind of password. If the authentication service determines that the community name is not appropriate for access to the agent, then the agent will reject the message.

The SNMP specification defines a protocol data unit (PDU) for use in the data portion of five different classes of SNMP messages. The PDU is an ANS.1 data structure including a Request ID of INTEGER type, an Error Status of INTEGER type, an Error Index of INTEGER type, a VarBind of SEQUENCE type, and a VarBindList which is a SEQUENCE OF VarBind. The Request ID identifies whether the PDU is for a Get request for obtaining values of instances of managed objects, a Get next request for obtaining the next value in a list of values, a Get response message for responding to a request message, a Set request for changing the values of instances of the managed objects, and a Trap message. The managed objects for a particular network element are defined in a data structure called a Management Information Base (MIB). The MIB includes Object Identifiers (OID) of the managed objects in the network element, and the OIDs are expressed as path names.

SNMP provides a very low level of security. There is a threat of eavesdropping or snooping. There is a threat that an unauthorized entity may alter in-transit SNMP messages. Moreover, the "community string" is accessible to anyone who may tap into the network, so that an unauthorized entity may assume the identity of an authorized entity. To guard against these threats, it is desired to have a mechanism for encrypting an SNMP message, and verifying that a message has not been altered in transit and has originated from a particular entity. However, it is also desired for the security mechanism to be as compatible as possible with the SNMP data structures and protocols.

An experimental protocol for Internet security is described in RFC 1910 by the Network Working Group, G. Walters, Editor, "User-based Security Model for SNMPv2," Feb. 1996, incorporated herein by reference. The Network Working Group recognizes that the security mechanism should entail no changes to the basic SNMP network management philosophy. In support of data integrity, a message digest is calculated over an appropriate portion of an SNMPv2 message and included as part of the message sent to the recipient. In support of data authentication, a secret value is both inserted into, and appended to, the SNMPv2 message prior to computing the digest; the inserted value is overwritten prior to transmission and the appended value is not transmitted. The secret value is shared by all SNMPv2 entities authorized to originate messages on behalf of the appropriate user. In support of data confidentiality, an encryption algorithm is required. An appropriate portion of the message is encrypted prior to being transmitted. Only the PDU is protected from disclosure by the privacy protocol. For an authenticated SNMPv2 message, the message digest is applied to the entire message given to the transport service. As such, message generation first privatizes the PDU, then adds the message wrapper, and then authenticates the message. This SNMPv2 message is an ASN.1 data structure with the following syntax:

```
Message : : =
    SEQUENCE {
        version
            INTEGER { v2 (2) },
        parameters
            OCTET STRING,
        — — <model = 1>
        — —     <qoS><agentID><agentBoots>
                    <agentTime><maxSize>
        — — —   <userLen><userName><authLen>
                    <authDigest>
        — — —   <contextSelector>
        data
            CHOICE {
                plaintext
                    PDUs,
                encrypted
                    OCTET STRING
            }
    }
```

Where <qoS> is a quality of service parameter for selecting either: (1) no authentication nor privacy; (2) authentication, no privacy; (3) authentication and privacy; or (4) generation of report PDU allowed. If the qoS specifies that the message is to be authenticated, then an MD5 digest value is computed over the octet sequence representing the concatenation of the serialized message value and the user's authentication key. The <authDigest> field is then set to the computed digest value. (MD5 is a cryptographically-strong hashing function described in R. Rivest, "The MD5 Message-Digest Algorithm," RFC 1321, Apr. 1992.")

Although the experimental protocol of RFC 1910 can provide integrity, authentication, and confidentiality, it is far from simple and is a departure from the SNMP network management philosophy and protocol.

SUMMARY OF THE INVENTION

In accordance with a basic aspect of the invention, a method provides confidentiality and authentication of data transmitted over a network from a manager to an agent in accordance with an ordinarily insecure network communication protocol. The method includes a network manager encrypting the data with secret information that the agent can recognize as having originated from the manager to produce an encryption result in which the data is scrambled with the secret information. The manager includes the encryption result in a data portion of a message having a message format in accordance with the ordinarily insecure network communication protocol and transmits the message to the agent. The agent receives the message from the manager, decrypts the data portion of the message, and recognizes the secret information to authenticate that the data received by the agent is the same as the data that was transmitted by the manager. By encrypting the data with the secret information, only one cryptographically-strong encryption operation is needed for ensuring confidentiality and authentication. Any one of a number of encryption techniques could be used, for example, a symmetrical or single-key technique such as the Data Encryption Standard (DES), an asymmetrical or public-private key technique such as RSA, or a coding table technique. For example, the data can be encrypted with the secret information by using a manager's private key as an encryption key for encrypting the management information, or by using an agent's public key for encrypting a combination of the management information and a manager's private key.

In accordance with another aspect of the invention, the manager decides that one portion of the data should be encrypted and another portion of the data should not be encrypted. The manager encrypts the portion of the data that should be encrypted to produce an encryption result, and transmits to the agent one message in accordance with the ordinarily insecure network communication protocol. This one message includes what appears to be a data portion, and this data portion includes the encryption result and secret information that the agent can recognize to verify that the one portion of the data as received by the agent is the same as the one portion of the data as transmitted by the manager. The manager transmits to the agent another message in accordance with the ordinarily insecure network communication protocol, and this message also has what appears to be a data portion including said another portion of the data in an unencrypted form. The agent receives said one message and said another message from the manager, recognizes that said one message contains encrypted information, and decrypts the encrypted information to obtain said one portion of the data and recognizes the secret information in said one message as received by the agent to authenticate that said one portion of the data as received by the agent is the same as said one portion of the data that was transmitted by the manager, and recognizes that said another message contains unencrypted data in the data portion of said another message. In this fashion, the ordinarily secure network communication protocol is used for sending secure messages as well as insecure messages.

In accordance with yet another aspect of the invention, the manager transmits to the agent an SNMP message including what appears to be a Protocol Data Unit including a Request ID, an Error Status, an Error Index, at least one Object ID, and a Value for the Object ID. The value for the Object ID includes encrypted management information and also includes secret information that the agent can recognize to verify that the management information received by the agent is the same as the management information transmitted by the manager. Therefore, the SNMP message has a standard format which is the same for encrypted and unencrypted messages and therefore tends to hide any encryption, and the Object ID visible in the SNMP message may identify a sub-agent for decrypting the SNMP message.

In accordance with yet another aspect of the invention, an apparatus provides confidentiality and authentication of data transmitted over a network from a manager to an agent in accordance with an ordinarily insecure network communication protocol. The apparatus includes a data processor and a memory containing a program for the data processor and coupled to the data processor for execution of the program by the data processor. The program includes a message transmission service for transmitting to the agent a message in accordance with the ordinarily insecure network communication protocol, and the message includes an apparent object identifier and a corresponding apparent value. The program also includes an encryption service for receiving an actual object identifier and a corresponding actual value for transmission to the agent, and inspecting the actual object identifier to determine whether or not the actual object identifier and corresponding actual value should be encrypted for transmission to the agent. When the encryption service has determined that the actual object identifier and corresponding actual value should be encrypted for transmission to the agent, the encryption service encrypts the actual object identifier and corresponding actual value to produce an encrypted result included in the corresponding apparent value, the corresponding apparent value including secret information that can be recognized by the agent to verify that the encrypted result as received by the agent is the same as the encrypted result as transmitted by the manager, and the encryption service produces the apparent object identifier to indicate that the corresponding apparent value includes an encrypted result, and passes the apparent object identifier and the corresponding apparent value to the message transmission service for transmission to the agent. When the encryption service has determined that the actual object and corresponding actual value should not be encrypted for transmission to the agent, the encryption service passes the actual object identifier to the message transmission service as the apparent object identifier and passes the corresponding actual value as the corresponding apparent value to the message transmission service.

In a preferred embodiment, an encryption service in the manager encrypts network management information with a secret key that the agent can recognize to produce an encryption result. The encryption service invokes an SNMP message transmission service in the manager to form a secure SNMP message having an apparent Object ID (OID) that identifies a decryption service in the network agent and having an apparent Value that includes the encryption result. The SNMP message transmission service invokes a communication protocol service in the manager to send the secure SNMP message to the agent. A communication protocol service in the agent receives the secure SNMP message, and passes the received message to an SNMP message reception service in the agent. The SNMP message reception service checks whether or not a Community Name visible in the secure SNMP message is appropriate for access to the agent, and when the Community Name visible in the secure SNMP message is found to be appropriate for access to the agent, searches a Management Information Base (MIB) in the agent for a sub-agent corresponding to the apparent OID, and when a sub-agent corresponding to the apparent OID is found in the MIB, dispatches the apparent Value of the apparent OID to the sub-agent. The sub-agent decrypts the encryption result in the apparent Value, and rejects the message when the sub-agent is unable to recognize a secret key authorized for access to the agent.

BRIEF DESCRIPTION OF THE DRAWINGS

Other objects and advantages of the invention will become apparent upon reading the following detailed description with reference to the accompanying drawings wherein.

Figure 1:
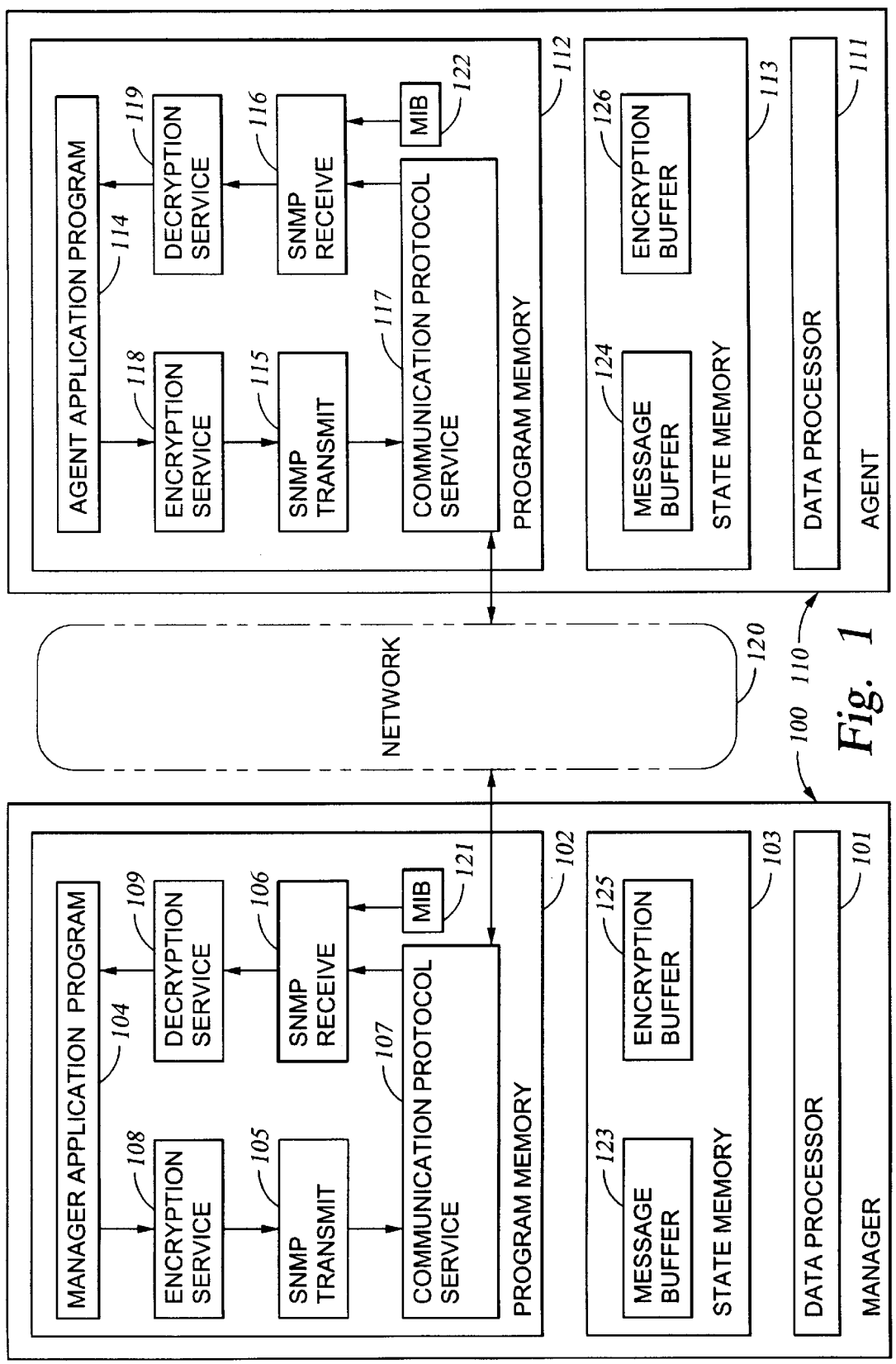
FIG. 1 is a block diagram of a manager and an agent using the method of the invention for communication of management information over a data network.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

Referring now to FIG. 1, there is shown a block diagram of a manager 100 and an agent 110 interconnected in a data network 120. As used herein, the term "manager" is defined as a data processing device transmitting a message over a network, and the term "agent" is defined as a data processing device receiving the message. The manager 100, for example, is a work station of a system administrator (not shown), and the agent 110 is a network file server being configured by the system administrator. The manager 100 includes a data processor 101, program memory 102, and state memory 103. The data processor 101 executes various programs in the program memory 102, and the execution changes information in the state memory 103. In a similar fashion, the agent 110 also includes a data processor 111, a program memory 112, and a state memory 113.

In the preferred embodiment, the manager 100 uses the Simple Network Management Protocol (SNMP) to inspect or alter management information of the agent 110. The manager 100 includes a manager application program 104 which specifies the management information to be inspected or altered, and the agent 110 includes an agent application program 114 capable of accessing or altering management information in the program memory 112 or state memory 113 of the agent 110.

SNMP is an application-level protocol which is invoked by the manager application program 104 or the agent application program 114 to send or receive messages using any kind of communication protocol. As shown in FIG. 1, the manager 100 has a SNMP transmit service 105 and a SNMP receive service 106 for transmitting and receiving, respectively, SNMP messages. The SNMP transmit service 105 invokes a communication protocol service 107 to transmit SNMP messages over the network 120. In a similar fashion, the communication protocol service 107 may receive SNMP messages from the network 120 and direct the messages to the SNMP receive service 106. The agent 110 likewise has a SNMP transmit service 115, a SNMP receive service 116, and a communication protocol service 117. The communication protocol services 107, 117, for example, use the Transmission Control Protocol (TCP/IP) or the User Datagram Protocol (UDP).

The SNMP receive service 106 accesses a Management Information Base (MIB) 121 that defines management information in the manager 100 that can be accessed in response to SNMP messages received by the manager. In a similar fashion, the SNMP receive service 116 accesses a Management Information Base (MIB) 122 that defines management information in the agent 110 that can be accessed in response to SNMP messages received by the agent. The state memory 103 in the manager 100 includes a message buffer 123 used by the SNMP transmit service 105 and the SNMP receive service 106. In a similar fashion, the state memory 113 in the agent 110 includes a message buffer 124 used by the SNMP transmit service 115 and the SNMP receive service 116.

The present invention more particularly relates to a security mechanism for SNMP. In the block diagram of FIG. 1, the security mechanism is provided by an encryption service 108 and a decryption service 109 in the manager 100, and a similar encryption service 118 and a decryption service 119 in the agent 110. In the preferred embodiment of the invention, the encryption service 108 is layered between the manager application program 104 and the SNMP transmit service 105, and the decryption service 109 is layered between the manager application program 104 and the SNMP receive service 106. In a similar fashion, in the preferred embodiment, the encryption service 118 is layered between the agent application program 114 and the SNMP transmit service 115, and the decryption service 119 is layered between the agent application program 114 and the SNMP receive service 116. The encryption service 108 and the decryption service 109 use an encryption buffer 125 in the manager's state memory 103. In a similar fashion, the encryption service 118 and the decryption service 119 use an encryption buffer 126 in the state agent's state memory 113.

In a preferred embodiment of the invention, the encryption service 108, 118 and the decryption service 109, 119 does not require any modification to the standard SNMP message format or the standard SNMP message passing protocol. In fact, the SNMP transmit and receive services 105, 106, 115, 116 need not be modified. The encryption and decryption services 108, 109, 118, 119 need only be loaded into the respective program memories 102, 112; references by the manager and agent application programs 104, 114 to the SNMP transmit services 105, 115 are changed to reference the respective encryption services 108, 118; and entries are added to the MIBs 121, 122 to reference the respective decryption services 109, 119.

Figure 2:
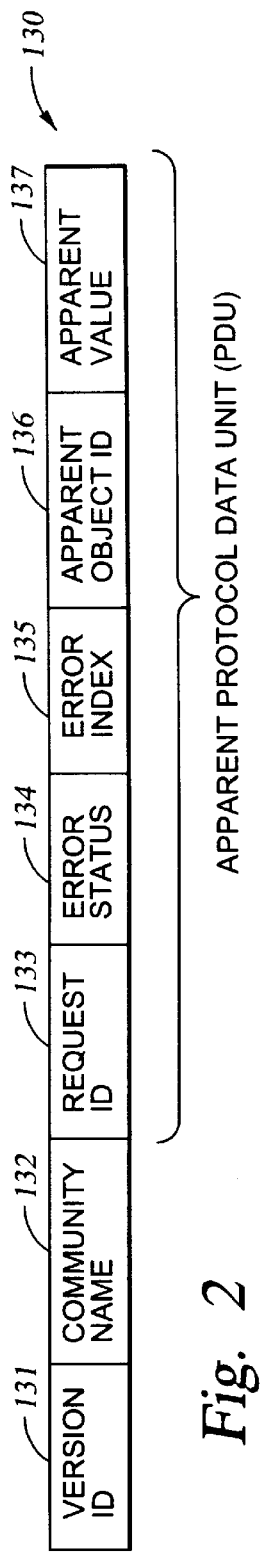
FIG. 2 is a schematic diagram of the content of a SNMP message containing an encrypted PDU in an apparent Value for an apparent OID in accordance with an aspect of the invention.

Referring now to FIG. 2, there is shown the content of a secure SNMP message 130 in accordance with the preferred embodiment of the invention. The message 130 appears to be a standard SNMP message having a Version ID 131, Community Name 132, a Request ID 133, an Error Status 134, an Error Index 135, an apparent Object ID 136, and an apparent Value 137. The Request ID 133, the Error Status 134, the Error Index 135, the apparent Object ID 136, and the apparent Value 137 together constitute an apparent Protocol Data Unit (PDU) for the SNMP message 130.

The PDU, the Object ID 136 and the Value 137 appearing in FIG. 2 are referred to as "apparent" because the encryption and decryption services of the present invention make the secure SNMP messages as observed on the network 120 different from the corresponding unencrypted SNMP messages as seen by the manager application program 104 and the agent application program 114. Where the secure SNMP messages differ from the corresponding unencrypted SNMP messages, the portions of the secure SNMP messages will be referred to as "apparent" and the portions of the unencrypted SNMP messages will be referred to as "actual".

In the preferred embodiment, the apparent value 137 in the apparent PDU contains an encryption of the actual PDU. Preferably the apparent value 137 is an opaque octet string. Normally, the same Request ID 133, the Error Status 134, and the Error Index 135 appear in both the apparent PDU and the actual PDU; if there is any difference, it will be assumed that the difference has resulted from corruption or from tampering by an unauthorized entity.

Figure 3:
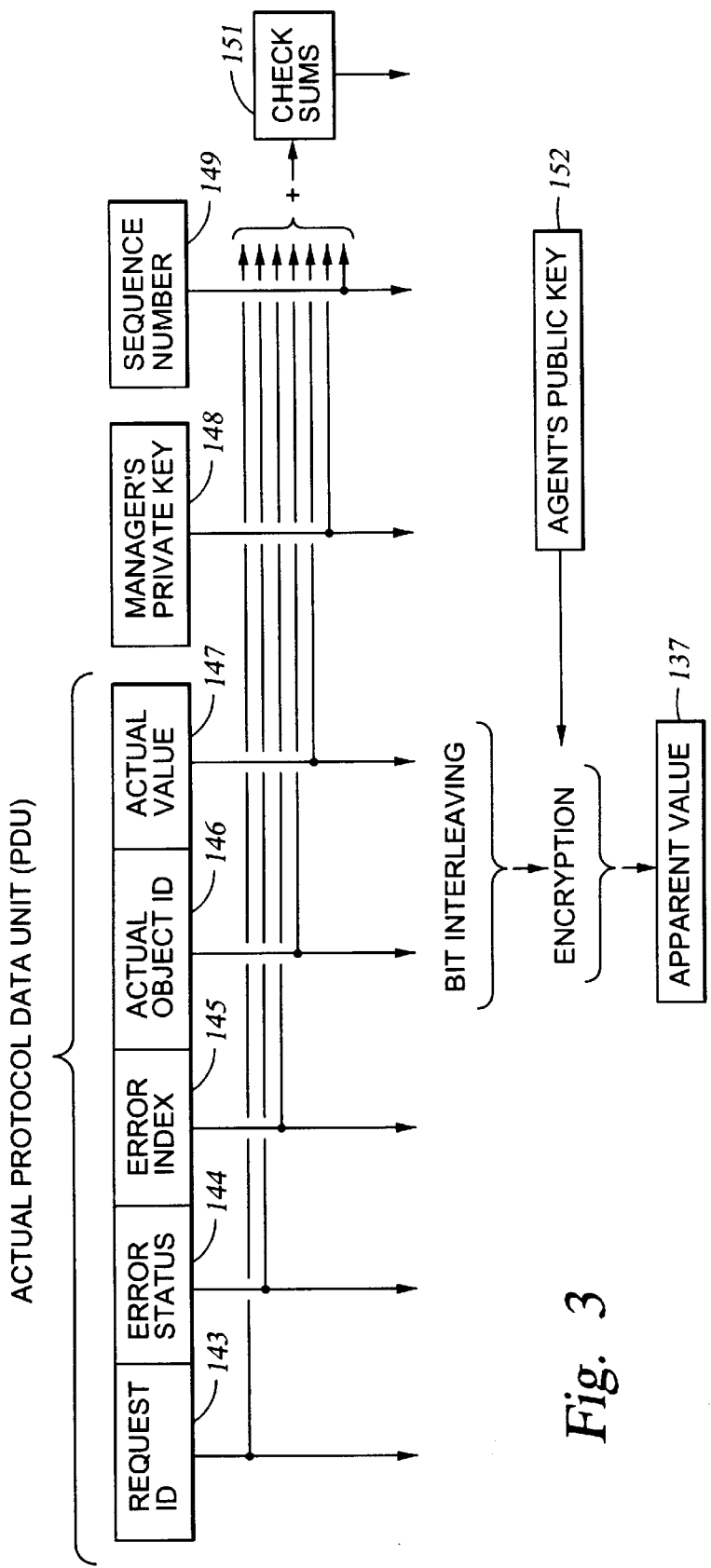
FIG. 3 is a schematic diagram showing content of an actual PDU encrypted with a manager's private key by using an agent's public key to compute the apparent value in the SNMP message of FIG. 2.

Referring now to FIG. 3, there is shown a diagram of the content of an actual PDU and the preferred method of encrypting it in the apparent value 137. The actual protocol data unit includes the Request ID 143, the Error Status 144, the Error Index 145, the actual Object ID 146, and the actual Value 147. The tail of the actual PDU may include any number of pairs of actual Object ID and actual Value, only one pair being shown in FIG. 3. In a preferred encryption method, the actual PDU is combined with the manager's private key 148 and the combination is encrypted so that the encryption process can provide a high level of authentication as well as confidentiality. Additional information, such as a sequence number 149, can also be encrypted in the apparent value 137. The sequence number 149 could be used for protection against a malicious entity intercepting and reordering the SNMP messages as transmitted over the network 120. The use of a sequence number and additional information such as time stamps for protection against various threats is further described in the RFC 1910 referenced above and entitled "User-Based Security Model for SNMPv2."

In order to provide a high level of integrity, a first step in the encoding process of FIG. 3 is to compute one or more check sums 151. These check sums 151 can be used during the decoding process to insure, with a very high level of confidence, that a message has been transmitted over the network without any tampering or corruption and then properly decrypted. For example, if a single check sum is computed, it is the sum of all of the octets in the actual PDU, the manager's private key 148, and the sequence number 149. If three check sums are computed, a second check sum would be a sum of half of the octets in the actual PDU, the manager's private key 148, and the sequence number 149, and the third check sum would be a sum of the other half of the bytes in the actual PDU, the manager's private key 148, and the sequence number 149. Additional check sums could be computed to provide a very high level of integrity. However, the encryption and decryption process itself may provide a relatively high level of integrity which may obviate any need for check sums.

Once the check sums are computed, the bits of the octets are interleaved in order to thoroughly shuffle the bits so that there is a minimal correlation between the bits in the octets of the interleaved result and a minimal correlation between the octets in the interleaved result. For example, the first bit in the interleaved result is the first bit in the first octet, the second bit in the interleaved result is the first bit in the second octet, the third bit in the interleaved result is the first bit in the third octet, etc. The precise manner of the interleaving could be secret information known to both the manager and the agent intended to receive the secure SNMP message and thus constitute part of the encryption key. Depending on the particular encryption method, such bit interleaving may not be needed as a separate pre-encryption step because it may be part of the encryption process. On the other hand, if the encryption process operates on individual octets, then interleaving should be performed in order to reduce the statistical correlation of the bits in each octet prior to encryption. Therefore, the interleaving process will make the encrypted result more difficult to "crack" using statistical methods.

In the encryption process shown in FIG. 3, an asymmetrical or two-key approach is shown for encryption. Therefore, after bit interleaving, the interleaved result is encrypted using the agent's public key 152, and the agent later performs decryption using the agent's private key. The two-key approach, for example, is the well-known RSA technique, named after its originators, Rivest, Shamir, and Adelman.

Figure 4:
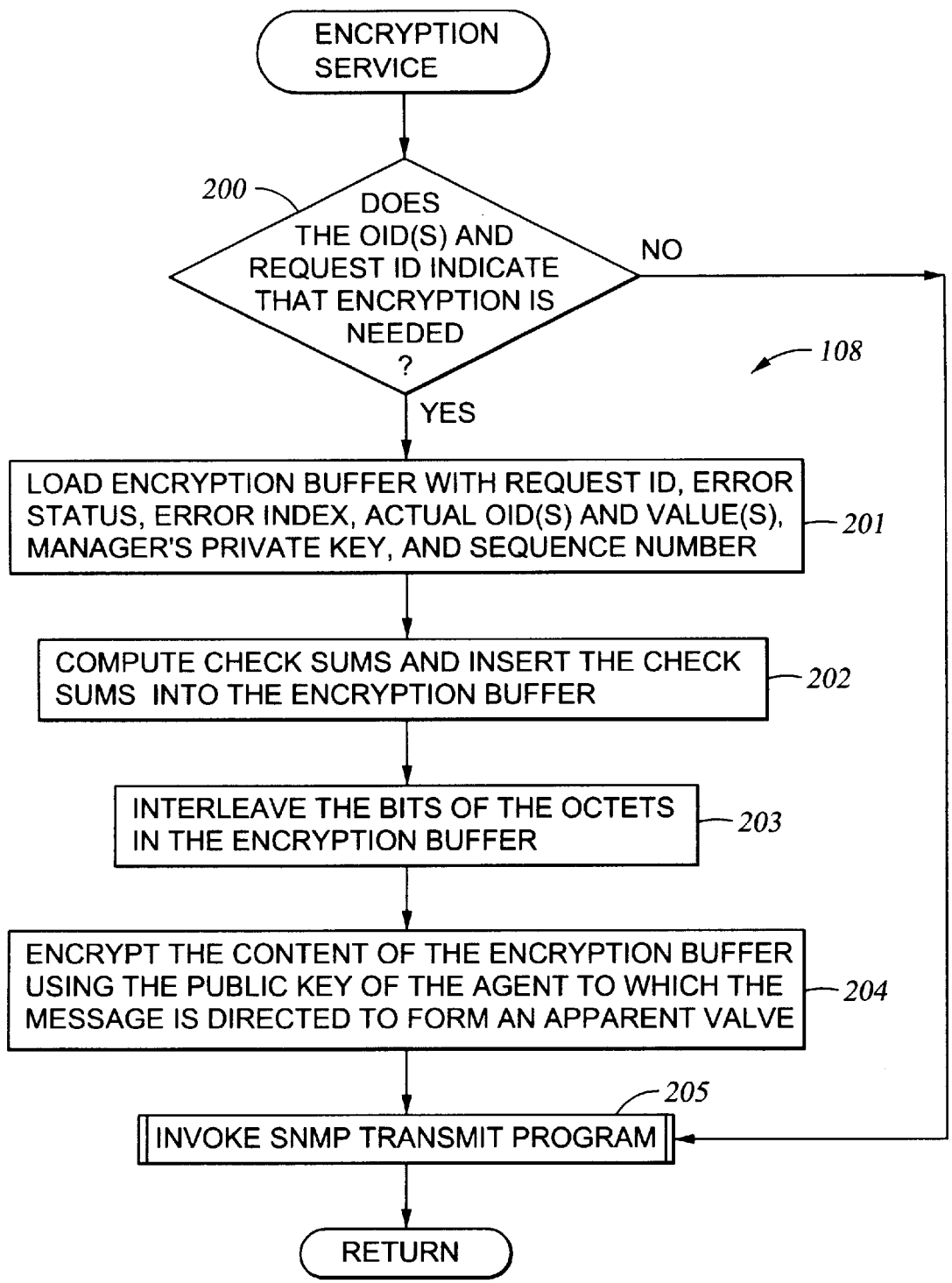
FIG. 4 is flow chart of an encryption service that computes the apparent value as shown in FIG. 3.

Referring now to FIG. 4, there is shown a flow chart of the encryption service 108. The encryption service 108 is invoked by the manager application program 104 in order to send an SNMP message to the agent application program 114. In the first step 200, the encryption service inspects the actual Object ID(s) and the Request ID to determine whether encryption is needed. If so, then execution continues to step 201. Not all SNMP messages need be encrypted, because not all OID values need be confidential or are subject to tampering. For example, if an OID would have what would be characterized as a public, read-only access type, there would be no need for encryption. The value of such an OID could be changed, for example, only at an operator terminal of the agent, or by down-loading of microcode into the agent, and not remotely with a SET Request ID message from a manager on the network. Other OIDs need be encrypted for SET Request IDs but not for GET response Request IDs. The SET message sends a value to which an object in the agent is to be set, and the Get response message sends to the agent a value of an object in the manager. For example, OIDs that specify certain configuration information such as alternative network addresses for a file server would not be confidential, because clients wanting to access the server should know the network addresses, but only an entity having the authority of a network administrator should be able to change the network addresses. This is an example of using the encryption method of the invention as a safety measure, to guard against an inadvertent as well as a malicious change in critical OID values that could cause a disruption in service.

In step 201, the encryption service loads the encryption buffer (125 in FIG. 1) with the Request ID, the Error Status, the Error Index, and the actual Object ID(s) and actual Value(s), the manager's private key, and the sequence number. Then in step 202 the encryption service computes the check sums (151 in FIG. 3) and inserts the check sums into the encryption buffer. Next, in step 203, the encryption service interleaves the bits of the octets in the encryption buffer. In step 204, the encryption service encrypts the content of the encryption buffer using the public key of the agent to which the message is directed. Finally, in step 205, the encryption service invokes the SNMP transmit service (105 in FIG. 1), and passes the encrypted value to the SNMP transmit service along with an apparent Object Identifier that identifies the corresponding decryption service of the agent to which the SNMP message is directed. Execution also branches to step 205 from step 200 when the Object ID(s) and the Request ID indicates that encryption is not needed. In this case, the actual Object ID(s) and the unencrypted Value(s) of the actual Object ID(s) are passed to the SNMP transmit program.

Figure 5:
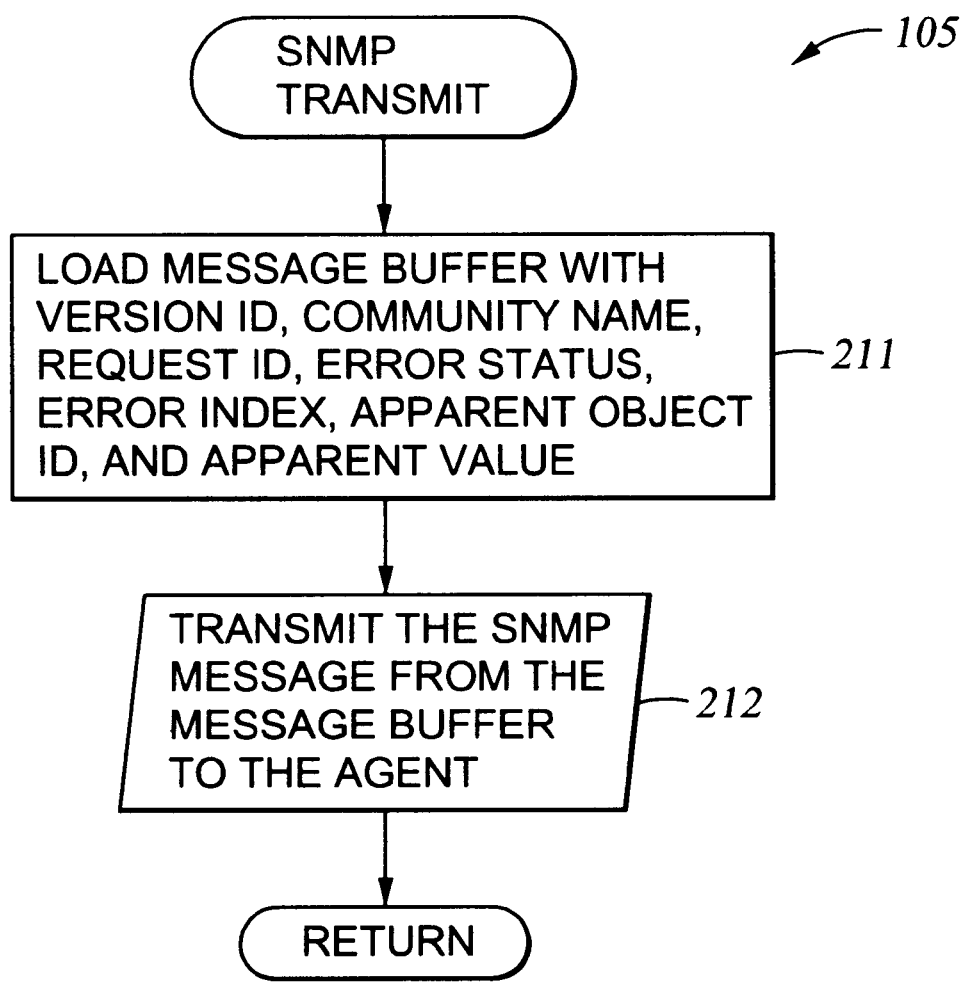
FIG. 5 is a flow chart of an SNMP message transmission service.

Referring now to FIG. 5, there is shown a flow chart of the SNMP transmit service 105. In a first step 211, the SNMP transmit service loads the manager's message buffer with the Version ID, the Community Name, the Request ID, the Error Status, the Error Index, the apparent Object ID, and the apparent Value. The apparent Value is the result of the encryption in step 204 of FIG. 4. The apparent Object ID identifies a managed object defined in the agent's Management Information Base (MIB) (122 in FIG. 1). This managed object is the agent's decryption service (119 in FIG. 1) that should decrypt the apparent Value. For example, the apparent Object ID identifies the beginning portion of the path name to the actual Object ID(s) encrypted in the apparent Value of the message. In the final step 212, the SNMP transmit service invokes the communication protocol service (107 in FIG. 1) to transmit the SNMP message from the manager's message buffer to the agent.

Figure 6:
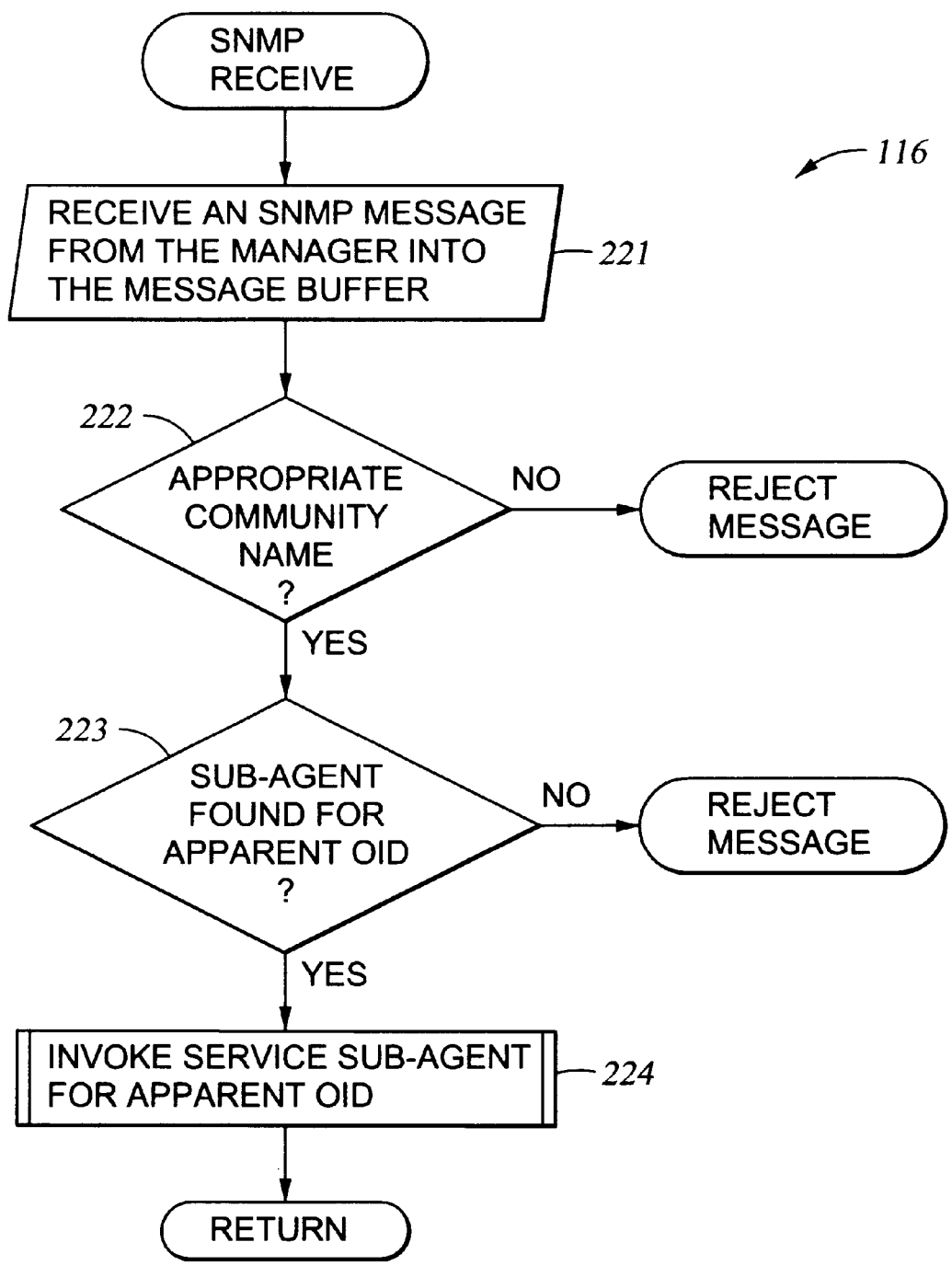
FIG. 6 is a flow chart of an SNMP message reception service.

Turning now to FIG. 6, there is shown a flow chart of the SNMP receive service 116 used by the agent for receiving the SNMP message. In a first step 221, the SNMP receive service receives the SNMP message from the manager into the agent's message buffer (124 in FIG. 1). In particular, the communication protocol service (117 in FIG. 1) places the SNMP message into the agent's message buffer (124 in FIG. 1) and then invokes the SNMP receive service. Then, in step 222, the SNMP receive service checks whether the Community Name of the message is appropriate for the agent. For example, the SNMP receive service attempts to match the Community Name against a list of Community Names appropriate for the agent. If the Community Name is not appropriate, then the message is rejected. Otherwise, execution of the SNMP receive service continues to step 223.

In step 223, the SNMP receive service searches for a sub-agent for the apparent Object ID of the message in the message buffer. In particular, the SNMP receive service attempts to match the apparent Object ID against a list of Object ID(s) maintained in the agent's MIB (122 in FIG. 1). If a sub-agent is not found for the apparent Object ID, then the message is rejected. Otherwise, execution continues to step 224.

In step 224, the SNMP receive service invokes the service sub-agent for the apparent Object ID. This service sub-agent is a decryption service if the apparent Value is encrypted, and otherwise is the service for an actual Object ID if the apparent value is unencrypted. For the agent 110 in FIG. 1, there is shown a single decryption service (119 in FIG. 1) that would be defined by the agent's MIB (112 in FIG. 1). However, it would be possible for the agent's MIB to define a number of different decryption services for respective Object IDs. Moreover, in this case, the secure SNMP message could include at its end a number of pairs of an apparent Object ID and a respective apparent Value.

Figure 7:
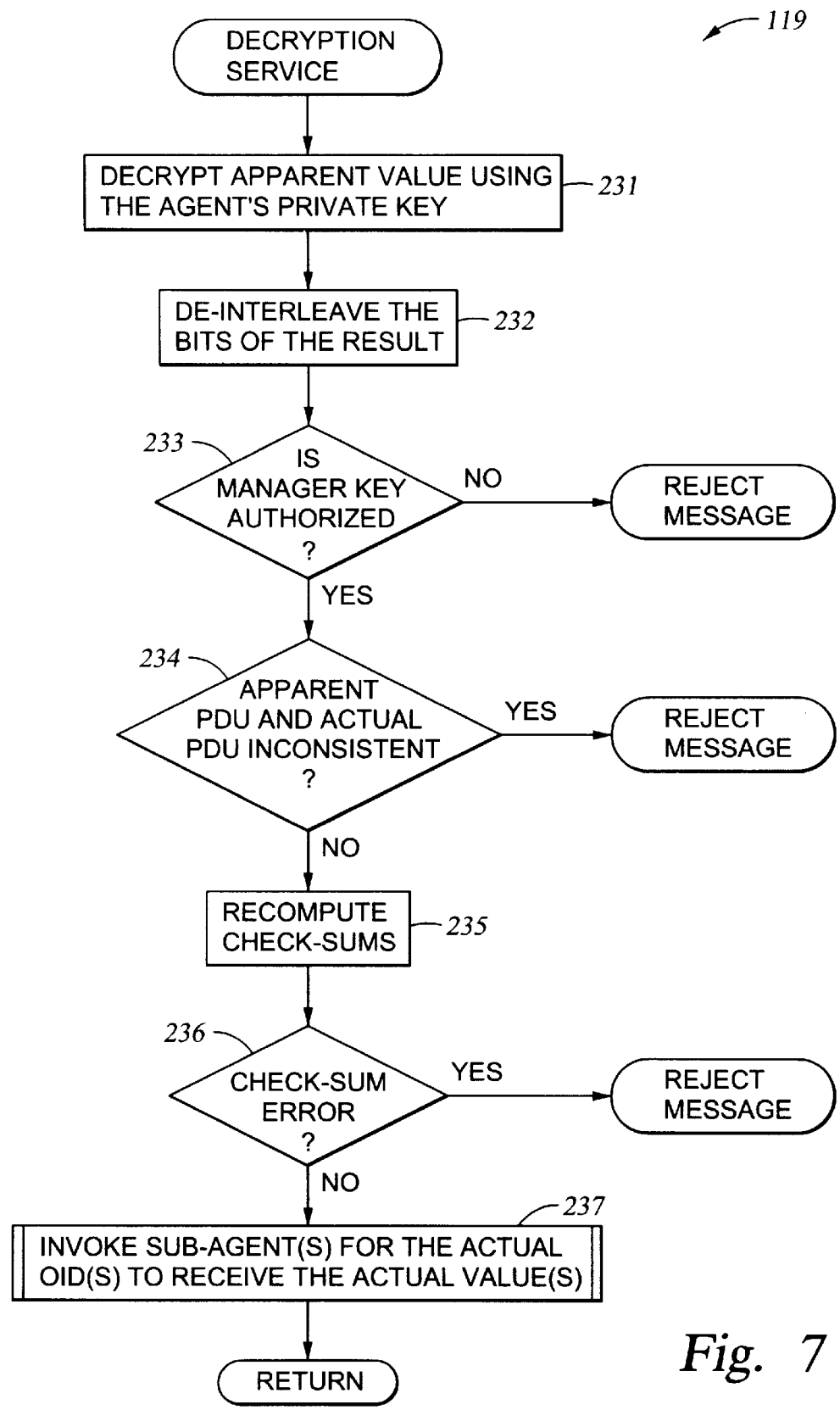
FIG. 7 is a flow chart of a decryption service that decrypts and authenticates the actual PDU from the apparent value in the SNMP message of FIG. 2.

Turning now to FIG. 7, there is shown a flow chart of the decryption service 119. In the first step 231, the decryption service decrypts the apparent value of the message in the agent's message buffer 124 using the agent's private key. Next in step 232 the decryption service de-interleaves the bits of the decryption result so as to remove the effect of bit interleaving performed in step 203 of the encryption service. Then, in step 233, the decryption service checks whether the manager's private key in the decrypted result is the key of a manager authorized to access the agent. If not, then the message is rejected. Otherwise, execution of the decryption service continues to step 234.

In step 234, the decryption service checks whether the apparent PDU in the secure SNMP message is inconsistent with the actual PDU in the decryption result. If the apparent Request ID is different from the actual Request ID, or if the apparent Error Status is different from the actual Error Status, or if the Error Index is different from the actual Error Index, then the message has been corrupted or tampered with and therefore it is rejected. In a similar fashion, if the apparent Object ID is inconsistent with the actual Object ID(s), the message is also rejected. The apparent Object ID is considered to be inconsistent with the actual Object ID(s) if the apparent Object ID is not a beginning path of the path name(s) for the actual Object ID(s). If the apparent PDU is not inconsistent with the actual PDU, then execution of the decryption service continues from step 234 to step 235.

In step 235, the decryption service recomputes the check-sums from the actual PDU in the decryption result. Then, in step 236, the decryption service compares the recomputed check sums with the check sums in the decryption result. If there is a check sum error, then the message is rejected. Otherwise, the decrypted message has been authenticated and its integrity has been verified, and execution continues from step 236 to step 237. In step 237, the decryption service invokes the sub-agent(s) for the actual Object ID(s) to receive the actual Value(s) in the decryption result.

As described above, the preferred embodiment of the invention encrypts the actual PDU with the manager's private key by encrypting the combination of the actual PDU and the manager's private key using an encryption key different from the manager's private key. Alternatively, the actual PDU could be encrypted with the manager's private key by using the manager's private key as the encryption key. This could be done using a single key technique such as the Data Encryption Standard (DES), or a coding table technique. In either case the decryption process itself can provide authentication with a high degree of confidence because the decoding process will either not generate a result or a result with a check-sum error unless the apparent value is decoded using the manager's private key. For example, by using a coding table technique, each octet to be encrypted could be used to address a respective coding table to substitute a string of more than eight bits for each octet. The manager's private key therefore is the series of tables to be used for encryption. The decryption process could involve a binary search for a matching entry in each table. If a matching entry is not found, then the message is rejected.

Figure 8:
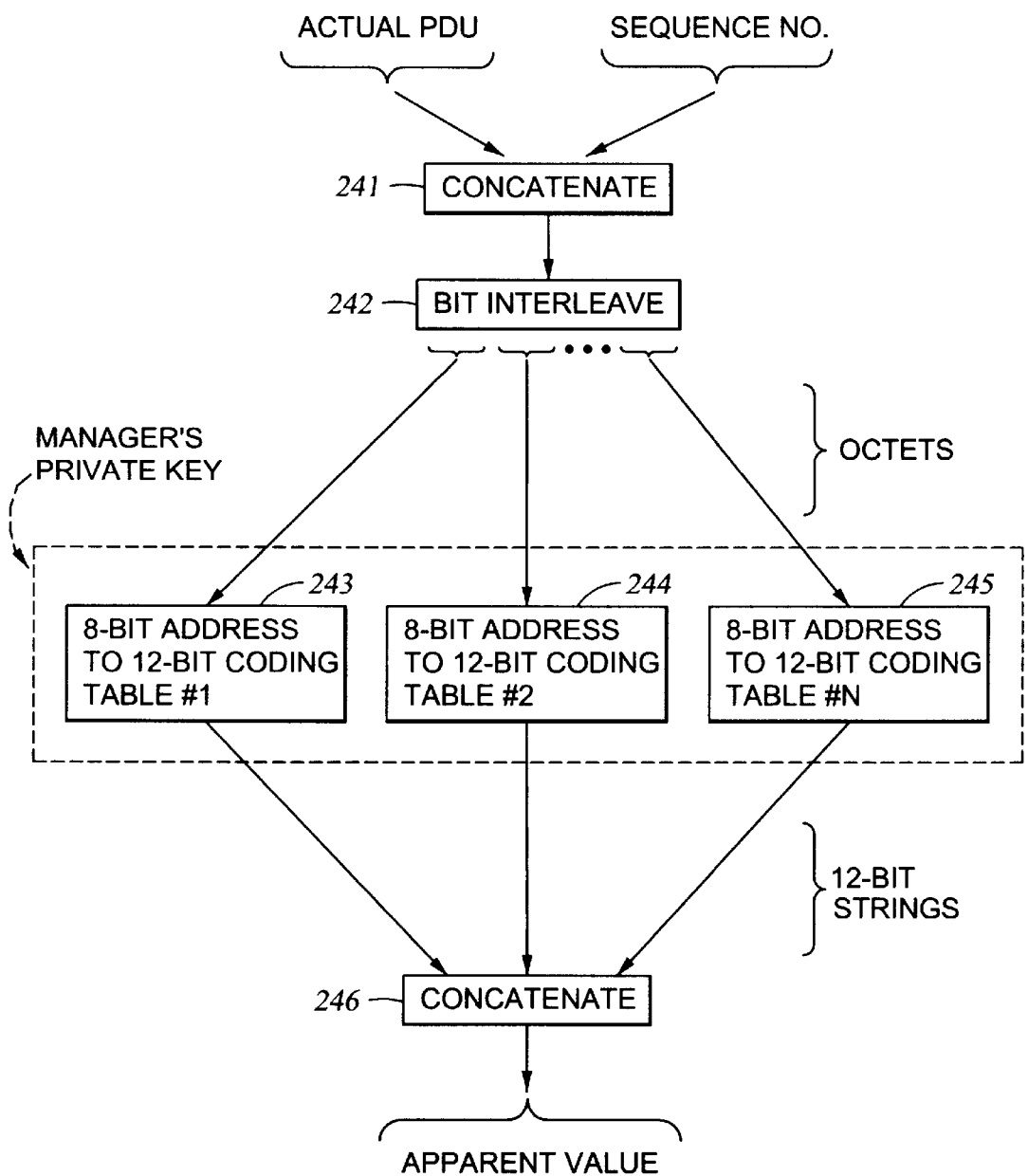
FIG. 8 is a flow graph of an encryption process using a series of coding tables that comprise a manager's private key.

Referring to FIG. 8, there is shown a flow diagram for a specific example of encryption using the coding table technique. The actual PDU and a sequence number for the message are concatenated in a first step 241. Then in a second step 242 the bits in the octets are interleaved as was described above with reference to step 203 of FIG. 4. For an actual PDU having N octets, each octet of the interleaved result addresses a respective one of N coding tables used in respective steps 243, 244, 245. These coding tables comprise the manager's private key. The coding tables can be formed from a series of random numbers. The random numbers are loaded into the tables but before each random number is loaded into each table a check is made of the random numbers already in each table, and if the random number is already in the table, then the random number is discarded. In this fashion, the entries in each table are unique. As shown in FIG. 8, the entries in each table are 12-bit strings. The 12-bit strings obtained by addressing the N coding tables are concatenated in step 246 to form the apparent value.

Figure 9:
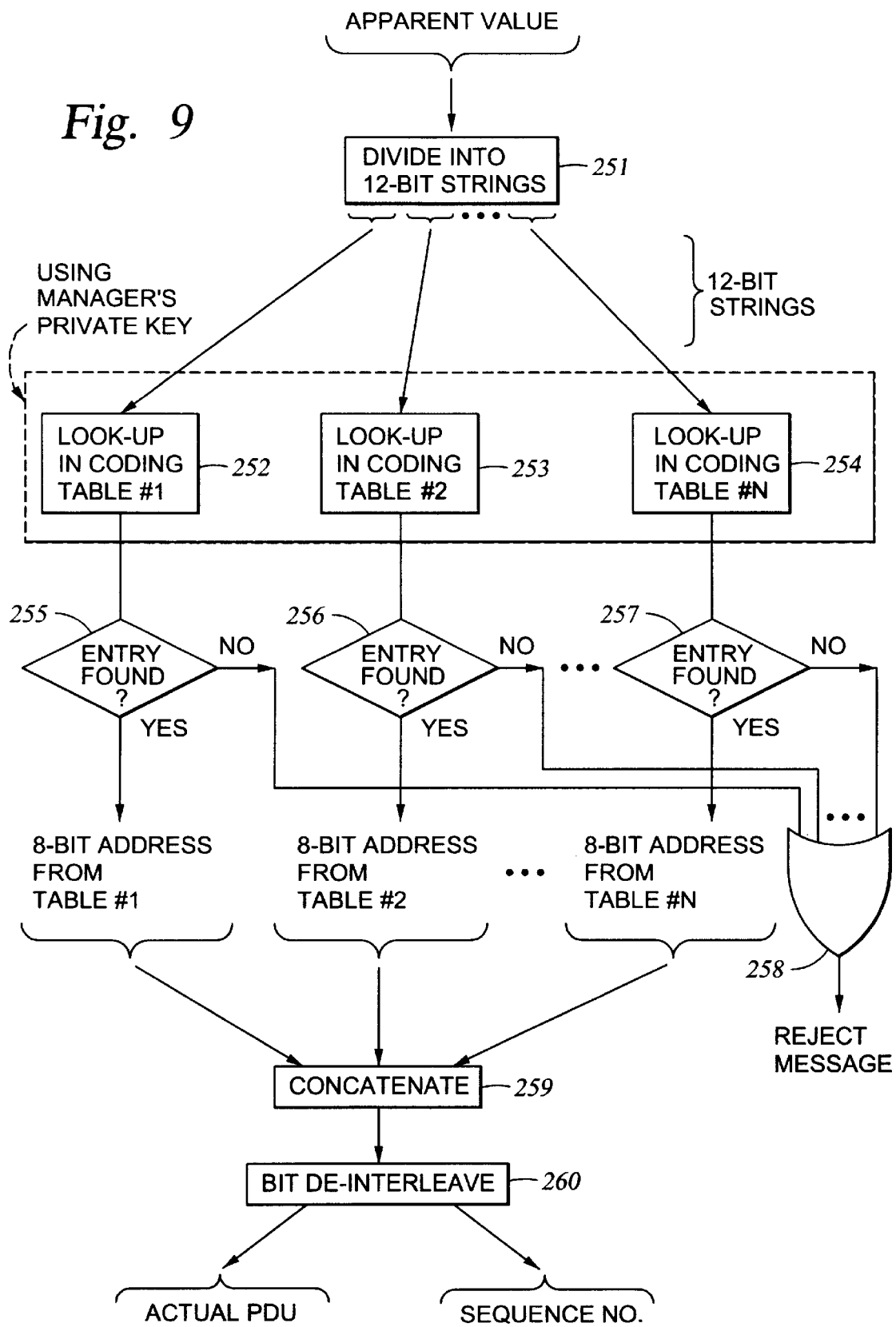
FIG. 9 is a flow graph of a decryption process corresponding to the encryption process of FIG. 8.

Referring to FIG. 9, there is shown a flow graph of the decryption process corresponding to the encryption process of FIG. 8. In a first step 251 of FIG. 9, the apparent value is divided into 12-bit strings. A look-up operation is performed in the coding tables in steps 252, 253, 254 in an attempt to find each 12-bit string in its respective coding table. When an entry is not found in any of the coding tables, as tested in steps 255, 256, 257, then the message is rejected, as depicted by the logical OR operation 258 in FIG. 9. If an entry is found in each of the tables, then the 8-bit addresses of the entries are concatenated in step 259. Finally, in step 260, a bit de-interleave operation is performed to produce the actual PDU and the sequence number that were encrypted in FIG. 8.

Although FIG. 9 shows the look-up operations being performed in parallel, they could be performed serially by a program loop including code that would be executed N times to decrypt the entire message and which would be terminated before being executed N times as soon as there would be a failure to find one of the 12-bit strings in its respective coding table. For example, the program loop could be programmed as follows:

```
      FOR J = 1 to N   /* N = No. Octets in plain-text */
      CALL SEARCH(TABLE(J), STRING(J), OCTET(J), FOUND)
      IF NOT FOUND THEN GO TO EXIT
      NEXT J
          * Process the message */
      ...
      END
EXIT     /* Reject the message */
      ...
END
      SUBROUTINE SEARCH(TABLE(J), STRING(J), OCTET(J),
      FOUND)
      /* Binary Search of TABLE(J) */
      /* TABLE(j) 256 has sorted entries */
      CLEAR FOUND
      K = 128
      L = 64
LOOP IF STRING(J) .EQ. TABLE(J, K) THEN GO TO OUT
      IF (L .LE. 1) THEN GO TO END
      L = L/2
      IF (STRING(J) .GT. TABLE(J, K)) THEN GO TO TEST
      K = K + L
      GO TO LOOP
UP       K = K - L
      GO TO LOOP
TEST     IF K .NE. 1 THEN RETURN
      K = 0
      IF (STRING(J) .NE. TABLE(J, K)) THEN RETURN
OUT      OCTET(J) = K
      SET FOUND
      RETURN
```

It should be apparent that the present invention offers a number of distinct advantages over the experimental protocol proposed in the RFC 1919, "User-Based Security Model for SNMPv2." First, by encrypting the actual PDU with the manager's private key, a single cryptographically-strong encryption procedure provides both confidentiality and authentication that the management information in the message originated from the particular manager.

Second, by inserting the encrypted PDU in an apparent value in the standard SNMP message format, there is no departure from the SNMP message format nor its network management philosophy, and the SNMP message transmission and reception services need not be modified for transmitting and receiving the secure SNMP messages.

Third, the standard SNMP message format can be used for both unencrypted messages and encrypted messages over a network. Set requests, for example, can be encrypted, and Get request can be unencrypted. This facilitates the use of encryption as a safety measure as well as a privacy technique. Moreover, an entity snooping on the network cannot easily determine whether or not a message is encrypted, because sometimes messages are encrypted and other times messages are not encrypted, and the format is the same in each case. By inserting the encrypted PDU in an apparent value having a data type of OPAQUE, the encrypted value is further hidden from view.

Fourth, the choice of the method of encryption does not affect the standard SNMP protocol. Therefore, the strength of the encryption method can be selected depending on legal prohibitions against strong encryption in certain geographic regions such as the United States. Moreover, if a strongly encrypted message is inadvertently transmitted into a geographic region where strong encryption is prohibited, it is less likely that the presence of the encryption will be noticed.

What is claimed is:

1. A method for providing confidentiality and authentication of data transmitted over a network from a manager to an agent in accordance with an ordinarily insecure network communication protocol, said method comprising the steps of:

a) a network manager encrypting the data with secret information that the agent can recognize as having originated from the manager to produce an encryption result in which the data is scrambled with the secret information; and b) the manager including the encryption result in a data portion of a message having a message format in accordance with the ordinarily insecure network communication protocol and being transmitted from the manager to the agent;

c) the agent receiving the message from the manager; and d) the agent decrypting the data portion of the message and recognizing the secret information to authenticate that the data received by the agent is the same as the data that was transmitted by the manager;

wherein the secret information is a private key of the manager, and wherein step (a) includes the manager using an encryption key to encrypt a combination of the private key of the manager and the data to produce the encryption result, and wherein step (a) includes combining the private key of the manager with the data by interleaving bits of the private key of the manager with bits of the data.

2. A method for providing confidentiality and authentication of data transmitted over a network from a manager to an agent in accordance with an ordinarily insecure network communication protocol, said method comprising the steps of:

a) a network manager encrypting the data with secret information that the agent can recognize as having originated from the manager to produce an encryption result in which the data is scrambled with the secret information; and b) the manager including the encryption result in a data portion of a message having a message format in accordance with the ordinarily insecure network communication protocol and being transmitted from the manager to the agent;

c) the agent receiving the message from the manager; and d) the agent decrypting the data portion of the message and recognizing the secret information to authenticate that the data received by the agent is the same as the data that was transmitted by the manager;

wherein step (a) includes using the secret information as an encryption key for encryption of the data for producing the encryption result, and wherein the encryption result includes a greater number of bits than the data, the message is changed during transmission from the manager to the agent, and step (d) includes the agent recognizing that the data portion does not include an encryption result that could have resulted from encryption of any possible data using the secret information as the encryption key.

3. A method for providing confidentiality and authentication of data transmitted over a network from a manager to an agent in accordance with an ordinarily insecure network communication protocol, said method comprising the steps of:

a) a network manager encrypting the data with secret information that the agent can recognize as having originated from the manager to produce an encryption result in which the data is scrambled with the secret information; and b) the manager including the encryption result in a data portion of a message having a message format in accordance with the ordinarily insecure network communication protocol and being transmitted from the manager to the agent;

c) the agent receiving the message from the manager; and d) the agent decrypting the data portion of the message and recognizing the secret information to authenticate that the data received by the agent is the same as the data that was transmitted by the manager;

wherein the message as transmitted from the manager to the agent includes what appears to be a protocol data unit including a request identifier, an error status, an error index, at least one object identifier, and a value for the object identifier, and wherein the encryption result is included in the value for the object identifier.

4. The method as claimed in claim 3, wherein the object identifier has an opaque data type.

5. The method as claimed in claim 3, wherein the agent includes a decryption service that is invoked when the agent recognizes the object identifier in the message as received by the agent, and the agent executes the decryption service to decrypt the value for the object identifier and to recognize the secret information to authenticate that the data received by the agent is the same as the data that was transmitted by the manager.

6. The method as claimed in claim 5, wherein the agent has a management information base and searches for the object identifier in the management information base to find the decryption service for interpreting the value corresponding to the object identifier.

7. The method as claimed in claim 6, wherein the agent executes a program for receiving the message, checking a community name in the message as received by the agent to determine whether the community name identifies a community of managers authorized to access the agent, and searching for the object identifier in the management information base to find a program for interpreting the value corresponding to the object identifier.

8. The method as claimed in claim 3, wherein the data that is encrypted to produce the encryption result in the value includes the request identifier, the error value, the error index, at least one actual object identifier, and an actual value for the actual object identifier.

9. The method as claimed in claim 8, wherein the object identifier visible in the message as transmitted by the manager to the agent is a beginning portion of a path name to each actual object identifier in the management information that is encrypted to produce the encryption result.

10. The method as claimed in claim 8, wherein the agent compares the request identifier, the error status, the error index, and the object identifier as found in the decryption result with the request identifier, the error status, the error index, and the object identifier that are visible in the message as received by the agent from the manager in order to detect any change from transmission of the message over the network from the manager to the agent.

11. A method for providing confidentiality and authentication of data transmitted over a network from a manager to an agent in accordance with an ordinarily insecure network communication protocol, said method comprising the steps of:

a) a network manager encrypting the data with secret information that the agent can recognize as having originated from the manager to produce an encryption result in which the data is scrambled with the secret information; and b) the manager including the encryption result in a data portion of a message having a message format in accordance with the ordinarily insecure network communication protocol and being transmitted from the manager to the agent;

c) the agent receiving the message from the manager; and d) the agent decrypting the data portion of the message and recognizing the secret information to authenticate that the data received by the agent is the same as the data that was transmitted by the manager;

which further includes transmitting an unencrypted message from the manger to the agent, the unencrypted message also having a message format in accordance with the ordinarily insecure network communication protocol, wherein the messages include an encrypted message to set a value of an object in the agent, and an unencrypted message to send to the agent a value of an object in the manager.

12. A method for providing confidentiality and authentication of data transmitted over a network from a manager to an agent in accordance with an ordinarily insecure network communication protocol, said method comprising the steps of:

a) a network manager encrypting the data with secret information that the agent can recognize as having originated from the manager to produce an encryption result in which the data is scrambled with the secret information; and b) the manager including the encryption result in a data portion of a message having a message format in accordance with the ordinarily insecure network communication protocol and being transmitted from the manager to the agent;

c) the agent receiving the message from the manager; and d) the agent decrypting the data portion of the message and recognizing the secret information to authenticate that the data received by the agent is the same as the data that was transmitted by the manager;

which further includes transmitting an unencrypted message from the manger to the agent, the unencrypted message also having a message format in accordance with the ordinarily insecure network communication protocol, and which includes the agent inspecting a respective object identifier included in each of the messages, and deciding whether or not to decrypt a respective data portion in each of the messages depending on the inspection of the respective object identifier included in each of the messages.

13. A method for providing confidentiality and authentication of data transmitted over a network from a manager to an agent in accordance with an ordinarily insecure network communication protocol, said method comprising the steps of:

a) a network manager encrypting the data with secret information that the agent can recognize as having originated from the manager to produce an encryption result in which the data is scrambled with the secret information; and b) the manager including the encryption result in a data portion of a message having a message format in accordance with the ordinarily insecure network communication protocol and being transmitted from the manager to the agent;

c) the agent receiving the message from the manager; and d) the agent decrypting the data portion of the message and recognizing the secret information to authenticate that the data received by the agent is the same as the data that was transmitted by the manager;

which further includes transmitting an unencrypted message from the manger to the agent, the unencrypted message also having a message format in accordance with the ordinarily insecure network communication protocol, and which includes the manager inspecting a respective request type identifier for each of the messages, and deciding whether or not to encrypt a respective data portion for each of the messages depending on the inspection of the respective request type identifier for each of the messages.

14. A method for providing confidentiality and authentication of data transmitted over a network from a manager to an agent in accordance with an ordinarily insecure network communication protocol, said method comprising the steps of:

a) the manager deciding that one portion of the data should be encrypted and another portion of the data should not be encrypted; and b) the manager encrypting the portion of the data that should be encrypted to produce an encryption result, the manager transmitting to the agent one message in accordance with the ordinarily insecure network communication protocol, said one message including what appears to be a data portion, the data portion of said one message including the encryption result and secret information that the agent can recognize to verify that said one portion of the data as received by the agent is the same as said one portion of the data as transmitted by the manager, and the manager transmitting to the agent another message in accordance with the ordinarily insecure network communication protocol, said another message also having what appears to be a data portion, the data portion of said another message including said another portion of the data in an unencrypted form;

c) the agent receiving said one message and said another message from the manager, recognizing that said one message contains encrypted information and decrypting the encrypted information to obtain said one portion of the data and recognizing the secret information in said one message as received by the agent to authenticate that said one portion of the data as received by the agent is the same as said one portion of the data that was transmitted by the manager, and recognizing that said another message contains unencrypted data in the data portion of said another message.

15. The method as claimed in claim 14, wherein the agent includes a decryption service and invokes the decryption service when the agent recognizes one object identifier in said one message identifying the decryption service, and wherein the agent recognizes another object identifier in said another message that does not identify a decryption service.

16. The method as claimed in claim 14, wherein the manager decides that said one portion of the data is to be encrypted because said one portion of the data is a value of one object for which values are to be encrypted for transmission to the agent, and wherein the manager decides that said another portion of data is not to be encrypted because it is a value of another object for which values are not to be encrypted for transmission to the agent.

17. The method as claimed in claim 14, wherein the manager decides that said one portion of the data is to be encrypted because said one portion of the data is a value to which an object in the agent is to be set, and wherein the manager decides that said another portion of the data is not to be encrypted because it is a value of an object in the manager.

18. The method as claimed in claim 14, wherein the manager encrypts said one portion of the data with the secret information to produce the encryption result, and wherein the data is scrambled with the secret information in the encryption result.

19. A method for providing confidentiality and authentication of network management information transmitted over a network from a manager to an agent in accordance with the Simple Network Management Protocol (SNMP), said method comprising the steps of:

a) the manager encrypting the management information to produce an encryption result;

b) the manager transmitting to the agent an SNMP message including what appears to be a Protocol Data Unit including a Request ID, an Error Status, an Error Index, at least one Object ID, and a Value for the Object ID, wherein the encryption result is included in the Value for the Object ID, and the Value for the Object ID includes secret information that the agent can recognize to verify that the management information received by the agent is the same as the management information transmitted by the manager;

c) the agent receiving the SNMP message from the manager; and d) the agent decrypting the encryption result in the Value of the SNMP message as received by the agent and recognizing the secret information in the Value of the SNMP message as received by the agent to authenticate that the management information received by the agent is the same as the management information that was transmitted by the manager.

20. The method as claimed in claim 19, wherein the agent includes a decryption service that is invoked when the agent recognizes the Object ID in the SNMP message as received by the agent, and the agent executes the decryption service to decrypt the encryption result in the Value for the Object ID and to recognize the secret information in the Value for the Object ID to authenticate that the management information received by the agent is the same as the management information that was transmitted by the manager.

21. The method as claimed in claim 20, wherein the agent has a Management Information Base (MIB) and searches for the Object ID in the Management Information Base to find the decryption service for interpreting the Value corresponding to the Object ID.

22. The method as claimed in claim 21, wherein the agent executes a standard SNMP program for receiving the SNMP message, checking a Community Name in the SNMP message as received by the agent to determine whether the Community Name identifies a community of managers authorized to access the agent, and searching for the Object ID in the Management Information Base to find a program for interpreting the Value corresponding to the Object ID.

23. The method as claimed in claim 19, wherein the management information that is encrypted to produce the encryption result in the Value includes the Request ID, the Error Value, the Error Index, at least one actual Object ID, and an actual Value for the actual Object ID.

24. The method as claimed in claim 23, wherein the Object ID visible in the SNMP message as transmitted by the manager to the agent is a beginning portion of a path name to each actual Object ID in the management information that is encrypted to produce the encryption result.

25. The method as claimed in claim 23, wherein the agent compares the Request ID, the Error Status, the Error Index, and the Object ID as found in the decryption result with the Request ID, the Error Status, the Error Index, and the Object ID that are visible in the SNMP message as received by the agent from the manager in order to detect any change from transmission of the SNMP message over the network from the manager to the agent.

26. The method as claimed in claim 19, wherein the secret information is a private key of the manager, and wherein step (a) includes the manager using an encryption key to encrypt a combination of the private key of the manager and the management information to produce the encryption result.

27. The method as claimed in claim 26, wherein the agent has a public key and a private key, the encryption key is the public key of the agent, and step (d) includes the agent using the private key of the agent to decrypt the encryption result to produce a decryption result, and recognizing the secret information by finding the private key of the manager in the decryption result.

28. The method as claimed in claim 26, wherein step (a) includes combining the private key of the manager with the management information by interleaving bits of the private key of the manager with bits of the management information, and encrypting the combination of the private key of the manager with the management information to produce the encryption result.

29. The method as claimed in claim 19, wherein step (a) includes using the secret information as an encryption key for encryption of the management information for producing the encryption result.

30. The method as claimed in claim 29, wherein the encryption result includes a greater number of bits than the management information, the SNMP message is changed during transmission from the manager to the agent, and step (d) includes the agent recognizing that the Value for the Object ID does not include an encryption result that could have resulted from encryption of any possible management information using the secret information as the encryption key.

31. A method for providing confidentiality and authentication of network management information transmitted over a network from a manager to an agent in accordance with the Simple Network Management Protocol (SNMP), said method comprising the steps of:
(a) an encryption service in the manager encrypts the network management information with a secret key that the agent can recognize to produce an encryption result;
(b) the encryption service invokes an SNMP message transmission service in the manager to form a secure SNMP message having an apparent Object ID (OID) that identifies a decryption service in the network agent and having an apparent Value that includes the encryption result;
(c) the SNMP message transmission service invokes a communication protocol service in the manager to send the secure SNMP message to the agent;
(d) a communication protocol service in the agent receives the secure SNMP message, and passes the received message to an SNMP message reception service in the agent;
(e) the SNMP message reception service checks whether or not a Community Name visible in the secure SNMP message is appropriate for access to the agent, and when the Community Name visible in the secure SNMP message is found to be appropriate for access to the agent, searches a Management Information Base (MIB) in the agent for a sub-agent corresponding to the apparent OID, and when a sub-agent corresponding to the apparent OID is found in the MIB, dispatches the apparent Value of the apparent OID to the sub-agent; and
(f) the sub-agent decrypts the encryption result in the apparent Value, and rejects the message when the sub-agent is unable to recognize a secret key authorized for access to the agent.

32. The method as claimed in claim 31, wherein the encryption service encrypts the network management information with a secret key that the agent can recognize by using the secret key as an encryption key for encrypting the network management information to produce the encryption result.

33. The method as claimed in claim 31, wherein the encryption service encrypts the network management information with a secret key that the agent can recognize by using an encryption key to encrypt a combination of the network management information and the secret key to produce the encryption result.

34. The method as claimed in claim 31, where the sub-agent decrypts the apparent value by searching for a combination of bits that can result from encryption of any possible network management information with a secret key authorized for access to the agent, and rejects the message upon failing to find a combination of bits that can result from encryption of any possible network management information with a secret key authorized for access to the agent.

35. The method as claimed in claim 31, wherein the network management information encrypted with the secret key that the agent can recognize includes a Protocol Data Unit having a Request ID, an Error Status, an Error Index, at least one Object ID, and a Value for the Object ID.

36. The method as claimed in claim 31, wherein the SNMP message transmission service forms the secure SNMP message by appending a Community Name, a Request ID, and Error Status, and an Error Index to the apparent Object ID and the apparent Value.

37. An apparatus for providing confidentiality and authentication of data transmitted over a network from a manager to an agent in accordance with an ordinarily insecure network communication protocol, comprising, in combination:
   a) a data processor; and
   b) a memory containing a program for the data processor and coupled to the data processor for execution of the program by the data processor; wherein the program includes:
      i) a message transmission service for transmitting to the agent a message in accordance with the ordinarily insecure network communication protocol, the message including an apparent object identifier and a corresponding apparent value; and
      ii) an encryption service for receiving an actual object identifier and a corresponding actual value for transmission to the agent; inspecting the actual object identifier to determine whether or not the actual object identifier and corresponding actual value should be encrypted for transmission to the agent; and
         when having determined that the actual object identifier and corresponding actual value should be encrypted for transmission to the agent, encrypting the actual object identifier and corresponding actual value to produce an encryption result included in the corresponding apparent value, the corresponding apparent value including secret information that can be recognized by the agent to verify that the actual object identifier and actual value as encrypted in the encryption result as received by the agent is the same as the actual object identifier and actual value as encrypted in the encryption result as transmitted by the manager, and producing the apparent object identifier to indicate that the corresponding apparent value includes an encryption result, and passing the apparent object identifier and the corresponding apparent value to the message transmission service for transmission to the agent; and
         when having determined that the actual object and corresponding actual value should not be encrypted for transmission to the agent, passing the actual object identifier to the message transmission service as the apparent object identifier and passing the corresponding actual value as the corresponding apparent value to the message transmission service.

38. The apparatus as claimed in claim 37, wherein the encryption service is executable by the data processor for determining that an actual object identifier and a corresponding actual value for a message for setting a value of an object in the agent should be encrypted and an actual object identifier and a corresponding actual value for a message for sending to the agent a value of an object in the manager should not be encrypted.

39. The apparatus as claimed in claim 37, wherein the encryption service is executable by the data processor to perform the encryption by encrypting the actual object identifier and the corresponding actual value with the secret information to produce the encryption result, and wherein the actual object identifier and the corresponding actual value are scrambled with the secret information in the encryption result.

40. An apparatus for producing secure messages in accordance with the Simple Network Management Protocol (SNMP), said apparatus comprising:
   a) a data processor; and
   b) a memory containing a program for said data processor and coupled to said data processor for execution of the program by the data processor; wherein the program includes
      i) an encryption service for encrypting management information with secret information that can be recognized as having originated from the apparatus to produce an encryption result in which the management information is scrambled with the secret information; and
      ii) an SNMP message transmission program for producing an SNMP message including the encryption result in a data portion of an SNMP message;
   wherein the encryption service is executable by the data processor for combining the secret information with the management information by interleaving bits of the secret information with bits of the management information.

41. An apparatus for producing secure messages in accordance with the Simple Network Management Protocol (SNMP), said apparatus comprising:
   a) a data processor; and
   b) a memory containing a program for said data processor and coupled to said data processor for execution of the program by the data processor; wherein the program includes
      i) an encryption service for encrypting management information with secret information that can be recognized as having originated from the apparatus to produce an encryption result in which the management information is scrambled with the secret information; and
      ii) an SNMP message transmission program for producing an SNMP message including the encryption result in a data portion of an SNMP message;
   wherein the SNMP message transmission program is executable by the data processor for including in the SNMP message what appears to be a Protocol Data Unit including a Request ID, an Error Status, an Error Index, at least one Object ID, and a Value for the Object ID, and wherein the encryption result is included in the Value for the Object ID.

42. The apparatus as claimed in claim 41, wherein the management information that is encrypted to produce the encryption result in the Value includes the Request ID, the Error Value, the Error Index, at least one actual Object ID, and an actual Value for the actual Object ID.

43. The apparatus as claimed in claim 42, wherein the Object ID visible in the SNMP message is a beginning portion of a path name to each actual Object ID in the management information that is encrypted to produce the encryption result.

44. An apparatus for interpreting a secure message in accordance with the Simple Network Management Protocol (SNMP), the secure message including a data portion having an encryption result of encrypting management information with secret information indicating a source of the management information, the management information being scrambled with the secret information in the encryption result, said apparatus comprising:

a) a data processor; and b) a memory containing a program for said data processor and coupled to said data processor for execution of the program by the data processor; wherein the program includes i) an SNMP message reception service for obtaining the data portion of the secure message, and ii) a decryption service for decrypting the encryption result in the data portion obtained by the SNMP message reception service and recognizing the secret information to authenticate that the management information received by the agent is the same as the management information that was transmitted by the source of the management information, wherein the encryption result is a result of using the secret information as an encryption key for encrypting the management information, and wherein the decryption service is executable by the data processor for using the secret information as a decryption key for decrypting the encryption result to produce a decryption result, and wherein the encryption result includes a greater number of bits than the management information, and the decryption service is executable by the data processor for recognizing that the data portion does not include an encryption result that could have resulted from encryption of any possible management information using the secret information as the encryption key.

45. An apparatus for interpreting a secure message in accordance with the Simple Network Management Protocol (SNMP), the secure message including a data portion having an encryption result of encrypting management information with secret information indicating a source of the management information, the management information being scrambled with the secret information in the encryption result, said apparatus comprising:

a) a data processor; and b) a memory containing a program for said data processor and coupled to said data processor for execution of the program by the data processor; wherein the program includes i) an SNMP message reception service for obtaining the data portion of the secure message, and ii) a decryption service for decrypting the encryption result in the data portion obtained by the SNMP message reception service and recognizing the secret information to authenticate that the management information received by the agent is the same as the management information that was transmitted by the source of the management information, wherein the secure message includes what appears to be a Protocol Data Unit including a Request ID, an Error Status, an Error Index, at least one Object ID, and a Value for the Object ID, wherein the encryption result is included in the Value for the Object ID, and wherein the SNMP reception service is executable by the data processor for invoking the decryption service upon recognizing the Object ID in the secure message.

46. The apparatus as claimed in claim 45, wherein the memory contains a Management Information Base (MIB) and the SNMP message reception service is executable by the data processor for searching for the Object ID in the Management Information Base (MIB) to find the decryption service for interpreting the Value corresponding to the Object ID.

47. The apparatus as claimed in claim 46, wherein the SNMP message reception service is executable by the data processor for checking a Community Name in the secure message to determine whether the Community Name identifies a community of sources authorized to access the apparatus.

48. The apparatus as claimed in claim 46, wherein:

the management information that is encrypted to produce the encryption result in the Value includes the Request ID, the Error Value, the Error Index, at least one actual Object ID, and an actual Value for the actual Object ID;

the Object ID visible in the secure message is a beginning portion of a path name to each actual Object ID in the management information that is encrypted to produce the encryption result; and the decryption service is executable by the data processor for comparing the Request ID, the Error Status, the Error Index, and the Object ID as found in the decryption result with the Request ID, the Error Status, the Error Index, and the Object ID that are visible in the secure message.

49. An apparatus for producing secure messages in accordance with the Simple Network Management Protocol (SNMP), said apparatus comprising:

a) a data processor; and b) a memory containing a program for said data processor and coupled to said data processor for execution of the program by the data processor; wherein the program includes i) an encryption service for encrypting management information to produce an encrypted result; and ii) an SNMP message transmission program for producing an SNMP message including what appears to be a Protocol Data Unit including a Request ID, an Error Status, an Error Index, at least one Object ID, and a Value for the Object ID, wherein the encryption result is included in the Value for the Object ID, and the Value for the Object ID includes secret information that can be recognized to verify that the encrypted management information has originated from the apparatus.

50. The apparatus as claimed in claim 49, wherein the management information that is encrypted to produce the encryption result in the Value includes the Request ID, the Error Value, the Error Index, at least one actual Object ID, and an actual Value for the actual Object ID.

51. The apparatus as claimed in claim 50, wherein the Object ID visible in the SNMP message is a beginning portion of a path name to each actual Object ID in the management information that is encrypted to produce the encryption result.

52. The apparatus as claimed in claim 49, wherein the secret information is a private key of the apparatus, and wherein the encryption service is executable by the data processor for using an encryption key to encrypt a combination of the private key of the apparatus and the management information to produce the encryption result.

53. The apparatus as claimed in claim 52, wherein the encryption service is executable by the data processor for combining the private key of the apparatus with the management information by interleaving bits of the private key of the apparatus with bits of the management information.

54. The apparatus as claimed in claim 49, wherein the secret information is a private key of the apparatus, and the encryption service is executable by the data processor for using the private key of the apparatus as an encryption key for encryption of the management information for producing the encryption result.

55. An apparatus for interpreting a secure message in accordance with the Simple Network Management Protocol (SNMP), the secure message including what appears to be a Protocol Data Unit including a Request ID, an Error Status, and Error Index, at least one Object ID, and a Value for the Object ID, wherein the Value for the Object ID includes an encryption result of encrypting management information, and the Value for the Object ID includes secret information that can be recognized to verify that the encrypted management information has originated from a source authorized for access to said apparatus, said apparatus comprising:

a) a data processor; and b) a memory containing a program for said data processor and coupled to said data processor for execution of the program by the data processor; wherein the program includes i) an SNMP message reception service for obtaining the Value for the Object ID in the secure message, and ii) a decryption service for decrypting the Value for the Object ID in the secure message and recognizing the secret information in the Value for the Object ID in the secure message to verify that the encrypted management information has originated from a source authorized for access to said apparatus.

56. The apparatus as claimed in claim 55, wherein the secret information is a private key of the source of the management information, the encryption result is a result of using an encryption key to encrypt a combination of the management information with the private key of the source of the management information, and wherein the decryption service is executable by the data processor for using a decryption key to decrypt the encryption result to produce a decryption result, and for recognizing the secret information by finding the private key of the source in the decryption result.

57. The apparatus as claimed in claim 55, wherein the encryption result is a result of using the secret information as an encryption key for encrypting the management information, and wherein the decryption service is executable by the data processor for using the secret information as a decryption key for decrypting the encryption result to produce a decryption result.

58. The apparatus as claimed in claim 57, wherein the encryption result includes a greater number of bits than the management information, and the decryption service is executable by the data processor for recognizing that the data portion does not include an encryption result that could have resulted from encryption of any possible management information using the secret information as the encryption key.

59. The apparatus as claimed in claim 55, wherein the SNMP reception service is executable by the data processor for invoking the decryption service upon recognizing the Object ID in the secure message.

60. The apparatus as claimed in claim 59, wherein the memory contains a Management Information Base (MIB) and the SNMP message reception service is executable by the data processor for searching for the Object ID in the Management Information Base (MIB) to find the decryption service for interpreting the Value corresponding to the Object ID.

61. The apparatus as claimed in claim 60, wherein the SNMP message reception service is executable by the data processor for checking a Community Name in the secure message to determine whether the Community Name identifies a community of sources authorized to access the apparatus.

62. The apparatus as claimed in claim 55, wherein:

the management information that is encrypted to produce the encryption result in the Value includes the Request ID, the Error Value, the Error Index, at least one actual Object ID, and an actual Value for the actual Object ID;

the Object ID visible in the secure message is a beginning portion of a path name to each actual Object ID in the management information that is encrypted to produce the encryption result; and the decryption service is executable by the data processor for comparing the Request ID, the Error Status, the Error Index, and the Object ID as found in the decryption result with the Request ID, the Error Status, the Error Index, and the Object ID that are visible in the secure message.

\* \* \* \* \*

-UNITED STATES PATENT AND TRADEMARK OFFICE
CERTIFICATE OF CORRECTION

PATENT NO.   :   6,044,468
DATED        :   March 28, 2000
INVENTOR(S)  :   Roger F. Osmond It is certified that error appears in the above-identified patent and that said Letters Patent is hereby corrected as shown below:

In claim 11, column 14 line 43, please change "manger" to --manager--.

In claim 12, column 15 line 6, please change "manger" to --manager--.

In claim 13, column 15 line 37, please change "manger" to --manager--.

Signed and Sealed this

Sixth Day of February, 2001

Attest:

Q. TODD DICKINSON

Attesting Officer

Director of Patents and Trademarks